(12) United States Patent
Loew et al.

(10) Patent No.: US 9,985,324 B2
(45) Date of Patent: May 29, 2018

(54) ELASTIC DEVICE FOR THE TEMPERATURE CONTROL OF BATTERY CELLS

(71) Applicants: Robert Bosch GmbH, Stuttgart (DE); Samsung SDI Co., Ltd., Yongin-si, Gyeonggi-do (KR)

(72) Inventors: Christian Loew, Stuttgart (DE); Achim Schmidt, Hamburg (DE)

(73) Assignees: Robert Bosch GmbH, Suttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 361 days.

(21) Appl. No.: 14/763,489

(22) PCT Filed: Jan. 16, 2014

(86) PCT No.: PCT/EP2014/050746
§ 371 (c)(1),
(2) Date: Jul. 24, 2015

(87) PCT Pub. No.: WO2014/114545
PCT Pub. Date: Jul. 31, 2014

(65) Prior Publication Data
US 2016/0006086 A1    Jan. 7, 2016

(30) Foreign Application Priority Data

Jan. 24, 2013    (DE) .................. 10 2013 201 102

(51) Int. Cl.
*H01M 10/625*    (2014.01)
*H01M 2/10*    (2006.01)
(Continued)

(52) U.S. Cl.
CPC ....... *H01M 10/625* (2015.04); *H01M 2/1077* (2013.01); *H01M 10/6556* (2015.04);
(Continued)

(58) Field of Classification Search
None
See application file for complete search history.

(56) References Cited

U.S. PATENT DOCUMENTS

2006/0115720 A1    6/2006    Kim
2011/0151305 A1    6/2011    Bolze et al.
(Continued)

FOREIGN PATENT DOCUMENTS

DE    10 2008 027 293 A1    12/2009
DE    10 2008 059 953 A1    6/2010
(Continued)

OTHER PUBLICATIONS

International Search Report corresponding to PCT Application No. PCT/EP2014/050746, dated Apr. 22, 2014 (German and English language document) (7 pages).

*Primary Examiner* — Alix E Eggerding
(74) *Attorney, Agent, or Firm* — Maginot, Moore & Beck LLP (57) ABSTRACT

A device for the temperature control of battery cells in a battery, particularly a battery configured as an energy source for the drive of hybrid, plug-in hybrid, or electric vehicles includes a contact surface for thermally contacting the battery cells with the device. The contact surface is configured such that the battery cells to be temperature-controlled are arranged on the contact surface. The device has elements below the contact surface that are elastically restoring such that, when a compressive load acting orthogonally to the contact surface is applied, the contact surface is lowered in the region of the applied compressive load. A restoring force acts against the compressive load.

16 Claims, 4 Drawing Sheets (51) Int. Cl.
    *H01M 10/6556*    (2014.01)
    *H01M 10/6567*    (2014.01)
    *H01M 10/6561*    (2014.01)

(52) U.S. Cl.
    CPC ... *H01M 10/6561* (2015.04); *H01M 10/6567* (2015.04); *H01M 2220/20* (2013.01)

(56) References Cited

U.S. PATENT DOCUMENTS

| | | | |
|---|---|---|---|
| 2011/0189525 A1 | 8/2011 | Palanchon et al. | |
| 2012/0301772 A1* | 11/2012 | Hirsch | H01M 10/0481 429/120 |
| 2013/0189558 A1* | 7/2013 | Haussmann | H01M 2/1083 429/120 |

FOREIGN PATENT DOCUMENTS

| | | |
|---|---|---|
| DE | 10 2009 040 147 A1 | 3/2011 |
| DE | 10 2009 058 861 A1 | 6/2011 |
| DE | 10 2010 009 478 A1 | 9/2011 |
| DE | 10 2010 021 922 A1 | 12/2011 |
| DE | 10 2010 032 898 A1 | 2/2012 |
| DE | 10 2010 038 600 A1 | 2/2012 |
| DE | 10 2010 038 681 A1 | 2/2012 |
| DE | 10 2011 109 286 A1 | 3/2012 |
| DE | 11 2011 103 338 T5 | 7/2013 |
| EP | 1 117 138 A1 | 1/2001 |
| EP | 2 355 204 A1 | 8/2011 |
| JP | 2000-048867 A | 2/2000 |
| WO | 2012/045175 A1 | 4/2012 |

\* cited by examiner

ELASTIC DEVICE FOR THE TEMPERATURE CONTROL OF BATTERY CELLS

This application is a 35 U.S.C. § 371 National Stage Application of PCT/EP2014/050746, filed on Jan. 16, 2014, which claims the benefit of priority to Serial No. DE 10 2013 201 102.4, filed on Jan. 24, 2013 in Germany, the disclosures of which are incorporated herein by reference in their entirety.

BACKGROUND

The disclosure relates to a device for the temperature control of battery cells of a battery, particularly a battery designed as an energy source for driving hybrid, plug-in hybrid, or electric vehicles, wherein the device has a contact surface for thermally contacting the battery cells with the device, the contact surface being designed in such a way that the battery cells to be temperature-controlled can be arranged on the contact surface.

Batteries, such as, in particular, rechargeable lithium-ion batteries, are of great importance as energy storage devices, especially for providing the energy required for driving in hybrid, plug-in hybrid or electric vehicles. Just like other types of battery, lithium-ion batteries are generally constructed from one or more battery modules, with a plurality of battery cells of the same type being interconnected to form a battery module. For reliable operation of such batteries and for optimized use of such batteries, especially as regards performance and service life, it must be ensured that the batteries are used only in a certain temperature range. Thus, especially in the case of a high power input or a high power output, heating of the battery cells beyond a certain temperature must be avoided, especially to avoid shortening the service life of the battery cells and to avoid "thermal runaway" of the battery cells. For this reason, the batteries or battery cells are usually temperature-controlled. For temperature control, cooling plates through which there is a flow of coolant, in particular, are used as the devices mentioned at the outset, wherein a cooling plate of this kind is in thermal contact with the battery cells of the battery via a contact surface, especially by arrangement of the battery cells on the cooling plate. In this way, there is thermal energy transfer between the contact surface of a corresponding device and the battery cells, wherein thermal energy transfer is dependent on the heat transfer resistance between the battery cells and the contact surface. For low heat transfer resistance and thus good thermal energy transfer, good contact between the battery cells and the contact surface is required. However, this is often problematic, especially since the battery cells are usually clamped together to form a battery module and the individual battery cells thus often do not rest in an optimum manner on the contact surface of the device for the temperature control of the battery cells. This leads to a sharp rise in heat transfer resistance. The problem is additionally exacerbated here by age-related deformations of the battery cells and by vibration and shock, especially when such battery modules are used in vehicles. These unwanted effects can even lead to individual battery cells not being in thermal contact with the device for the temperature control of the battery cells. In this case, there is no longer the possibility of adequate temperature control of the battery cells concerned, as a result of which the battery cells and consequently even the entire battery can be irreparably damaged.

Given this background situation, it is an object of the present disclosure to improve a device mentioned at the outset, especially as regards the contacting of battery cells clamped together to form a battery module with the contact surface of a device for the temperature control of the battery cells. In particular, the intention here is to minimize gaps between the battery cells to be temperature-controlled and the contact surface.

SUMMARY

To achieve the object, a device for the temperature control of battery cells of a battery, particularly a battery designed as an energy source for driving hybrid, plug-in hybrid, or electric vehicles is proposed, wherein the device has a contact surface for thermally contacting the battery cells with the device, the contact surface being designed in such a way that the battery cells to be temperature-controlled can be arranged on the contact surface, wherein the device has elements below the contact surface that are designed to have an elastic restoring action in such a way that, when a pressure load acting orthogonally to the contact surface is applied, the contact surface is lowered in the region of the applied pressure load, wherein a restoring force acts counter to the pressure load. This means that, if a battery or a battery module of a battery having a plurality of battery cells arranged parallel to one another and clamped together is arranged on the contact surface for thermally contacting the battery cells with the device, with the result that the battery cells are each contacted with the contact surface by means of one side, the contact surface is lowered owing to the pressure load originating from the battery cells and acting orthogonally to the contact surface. If the battery cells are clamped together, so that some of the battery cells project further from the assembly of battery cells clamped together in the region of the battery cells which is to be contacted, that is to say the battery cells are offset relative to one another, these battery cells which project further out exert a greater pressure on the contact surface, as a result of which the contact surface is lowered to a greater extent in the region of these projecting battery cells than in the region in which battery cells projecting less far out act on the contact surface. If there is a change in the offset between individual battery cells, owing to vibration or shock for example, the contact surface is readjusted to match the change in the position of the respective battery cell by the elements designed to have an elastic restoring action and the restoring force originating from said elements. In this way, different distances from individual battery cells are advantageously compensated, advantageously even if the position and/or the contact surface of one or more battery cells changes over time owing to age-related deformations or other effects, such as shock or vibration. There is advantageously no interruption here in thermal contact between the device for the temperature control of the battery cells and the battery cells. At the same time, the heat transfer resistance remains advantageously constant.

According to an advantageous embodiment of the disclosure, it is envisaged that the device has a channel system, which is designed in such a way that a fluid can be passed through the channel system. Here, the fluid can be air or a liquid, in particular a coolant. Thermal energy transfer between the device and the battery cells is thereby advantageously improved. The fluid is preferably a water/glycol mixture or the refrigerant R1234yf.

According to a particularly preferred embodiment of the disclosure, the channel system has a plurality of channels, which are arranged parallel to one another and each have a lower wall, two mutually opposite side walls and an upper wall, wherein the outer surface of the upper wall at least partially forms the contact surface of the device. By means of the walls, the channels advantageously form a closed channel system.

In particular, the channels are designed to allow through a flow of a fluid, especially a coolant. The channels are preferably connected to one another by connecting elements, with the result that the fluid flows through the channels in succession. According to an advantageous embodiment, the connecting elements are flexible hoses, preferably plastic hoses. As a variant embodiment, it is envisaged that the channels together with the connecting element are of one-piece design, such that the channels form a single channel, this channel then having a plurality of channel segments arranged parallel to one another. In this variant embodiment, the channel system is the channel and the plurality of channel segments arranged parallel to one another is the plurality of channels arranged parallel to one another.

According to another advantageous embodiment of the disclosure, the elements designed to have an elastic restoring action are arranged below the lower wall of the channels. In particular, it is envisaged that the channels are arranged on diaphragm springs or leaf springs as elements designed to have an elastic restoring action. Here, the elements with an elastic restoring action are preferably arranged on a support plate, particularly preferably on a plate having a heat-reflecting surface or with a heat-reflecting surface coating. Here, the battery cells or battery modules comprising the battery cells, are advantageously arranged directly on the channels. In this arrangement, at least the upper wall of the channels advantageously consists of a material of good thermal conductivity, such as aluminum or copper.

A preferred variant embodiment of the disclosure envisages that the side walls of the channels are the elements designed to have an elastic restoring action. It is thereby advantageously possible to reduce the outlay on material and the overall size. The resulting saving in space and weight is particularly advantageous, especially when using the device according to the disclosure in a vehicle. Thus, it is possible, in particular, to omit the use of a base support plate and additional elements designed to have a restoring action. It is advantageous if the side walls of the channels are each designed in such a way that they can be compressed under a pressure load. That is to say that, under a pressure load due to arrangement of the battery cells on the channels, the cross-sectional area of the corresponding channels decreases. In this case, the side walls are advantageously configured in such a way that complete compression of the channels does not occur and hence fluid flow through the channel is ensured. According to a preferred embodiment of the disclosure, the side walls of the channels each have a meandering configuration. In this case, the side wall is advantageously configured in such a way that the surface which forms the side wall is longer than the distance from the lower wall to the upper wall. As a variant of a meandering configuration of the side wall, an embodiment in the form of a zigzag corrugation is proposed. Here, the meandering or zigzag structure advantageously allows compression of the side walls of the channels under a pressure load. In this case, the side channels are preferably produced from an elastomer. According to another variant embodiment, the side walls of the channels are designed to have an elastic restoring action and, in addition, elements designed to have an elastic restoring action are arranged below the lower wall of the channels.

Another advantageous variant embodiment of the disclosure is characterized in that the upper wall has two side regions and a central region, which is offset outward relative to the side regions, wherein the outer surface of the central region forms the contact surface of the device, and the side regions form the elements with the elastic restoring action. In this variant embodiment, the distance between the central region of the upper wall of the channel and the lower wall of the channel is therefore greater than the distance between the side regions of the upper wall of the channel and the lower wall of the channel. Here, the central region of the upper wall is advantageously connected to the side regions of the upper wall by further side walls. In such a variant embodiment of the disclosure, at least the side regions of the upper wall are preferably produced from an elastomer. With such an embodiment, the geometrical structure of a channel is advantageously of low complexity, thereby advantageously simplifying the production of this structure. Those ends of the side regions of the upper wall which are arranged on the side walls are advantageously designed in such a way that they act like solid-body hinges and thus allow lowering of the upper wall in the central region and hence lowering of the contact surface of the device when there is a pressure load acting orthogonally to the contact surface.

It is advantageous if the width of a channel corresponds at the maximum to the width of a battery cell to be temperature-controlled. In particular, it is envisaged that the width of a channel corresponds, apart from a clearance with respect to the further channels, which are each arranged in parallel, to the width of a battery cell to be temperature-controlled, wherein the clearance preferably amounts to at least a few micrometers and preferably to no more than 10 millimeters. The battery or battery module of a battery is advantageously arranged in such a way on the device, with the battery cells clamped together to form an assembly, that one battery cell is arranged on each channel of the channel system of the device. Here, the contact surface of the device is formed by the contact surfaces of the respective channels, wherein one battery cell is in thermal contact with the contact surface of each channel.

Another advantageous embodiment of the disclosure envisages that the width of a plurality of channels corresponds to the width of a battery cell to be temperature-controlled. In this case, small clearances can be provided between the channels, ensuring that the channels do not hinder each other as they are lowered under a pressure load. For example, provision is made for four channels to be arranged in parallel adjacent to one another in such a way that one battery cell is supported by these four channels. Increasing the number of channels advantageously provides improved contact between the contact surface of the channels and the battery cell if the battery cell surface to be brought into contact with the device is not flat and is therefore, in particular, not parallel to the surface formed by the channels, owing to age-related deformations, for example.

BRIEF DESCRIPTION OF THE DRAWINGS

Further advantageous details, features and embodiment details of the disclosure are explained in greater detail in conjunction with the illustrative embodiments shown in the figures, where.

DETAILED DESCRIPTION

Figure 1:
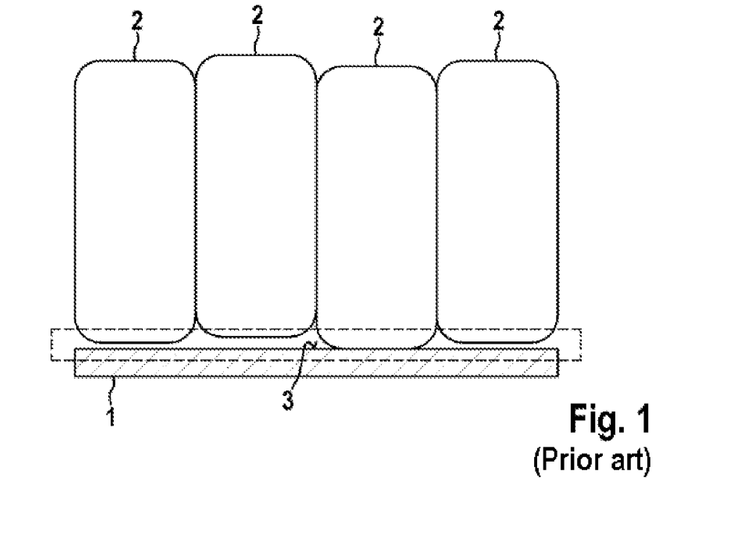
FIG. 1 shows a cooling plate, known in the prior art, for the temperature control of battery cells in a schematic illustration.

FIG. 1 shows a device 1, known in the prior art, for the temperature control of battery cells 2, wherein the device 1 is designed as a cooling plate through which there is a flow of coolant. The battery cells 2 are clamped together to form a battery module (although means for cell clamping are not shown explicitly in FIG. 1), wherein the battery cells 2 are offset vertically relative to one another owing to manufacturing tolerances and to vibration during operation, with the result that in some cases a gap is formed between the cooling plate 1 or contact surface 3 of the cooling plate 1 and the respective battery cells 2. This gap differs in the case of the battery cells 2 shown in FIG. 1 (the box in dashed lines shown in FIG. 1, FIG. 2 and FIG. 6 being intended to illustrate the differences between a device according to the prior art and a device according to the disclosure). Here, a gap between the contact surface 3 of the cooling plate 1 and the battery cells leads to impairment of heat transfer between the cooling plate 1 and the battery cells 2 at a distance from the contact surface 3 of the cooling plate.

Figure 2:
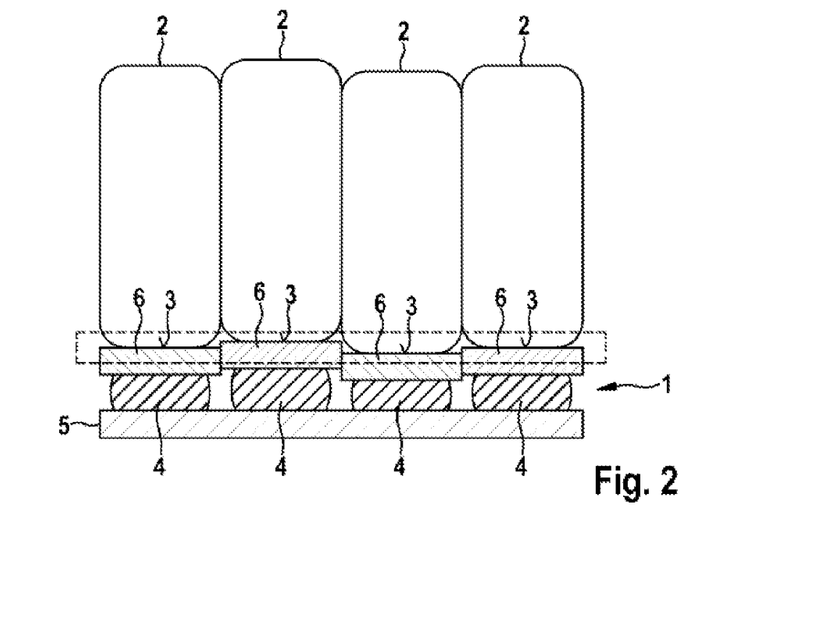
FIG. 2 shows a longitudinal section through an illustrative embodiment of a device according to the disclosure for the temperature control of battery cells in a schematic illustration.

A device 1 according to the disclosure for the temperature control of battery cells 2 of a battery is shown in FIG. 2, in which the abovementioned problem of poor contact between the battery cells and the contact surface of the device for temperature control does not exist. To ensure thermal contact between the battery cells 2 and the device 1, the device has a contact surface 3, which comprises four separate contact surfaces 3 in the illustration according to FIG. 2. Here, the contact surfaces 3 are designed in such a way that the battery cells 2 to be temperature-controlled can be arranged on the contact surfaces 3.

The device 1 shown in FIG. 2 has a channel system comprising a plurality of channels 6, which are arranged parallel to one another and are designed in such a way that a coolant can be passed through the channels 6. Here, the coolant flows through the channels 6 perpendicularly to the plane of the drawing. The channels 6 each have a lower wall, two side walls situated opposite one another, and an upper wall, which together form a rectangular cross section. Here, the outer surface of the upper wall of a channel 6 in each case forms a contact surface 3, wherein the contact surfaces 3 of all the channels 6 here form the contact surface 3 of the device 1. Elements 4 designed to have an elastic restoring action are arranged below the channels 6 and thus below the contact surface 3 of the device 1, on a support plate 5. Here, the elements 4 designed to have an elastic restoring action ensure that the channels 6 and thus the contact surface 3 are lowered when a pressure load acting orthogonally to the contact surface 3 is applied. Since the individual battery cells 2 are each arranged on one channel 6 or the contact surface 3 of one channel 6 and since the channels 6 are each arranged independently on elements 4 designed to have an elastic restoring action, the total contact surface 3 of the device 1 consisting of the contact surfaces 3 of the individual channels 6 is formed in such a way that it can be lowered in the region of the pressure load applied. In this case, a restoring force originating from the elements 4 designed to have an elastic restoring action counteracts the pressure load. When the battery cells 2 are arranged on the contact surface 3 of the device, the pressure load is in each case exerted by the weight of the battery cells 2 themselves.

In the illustrative embodiment shown in FIG. 2, the elements 4 designed to have an elastic restoring action are configured in the manner of leaf springs, which at least partially yield under the load imposed by the respective battery cell 2 and undergo a restoring action in the direction of the original position when the load is relieved, e.g. through a change in the offset of a battery cell 2 in the cell assembly, wherein an element 4 designed to have an elastic restoring action and hence the respective contact surface 3 under which the relevant element designed to have a restoring action is arranged reassume the original position when the load is relieved completely. To improve thermal conductivity, a heat conducting compound, e.g. a thermal paste, can be introduced between contact surfaces 3 and the battery cells 2.

Figure 3:
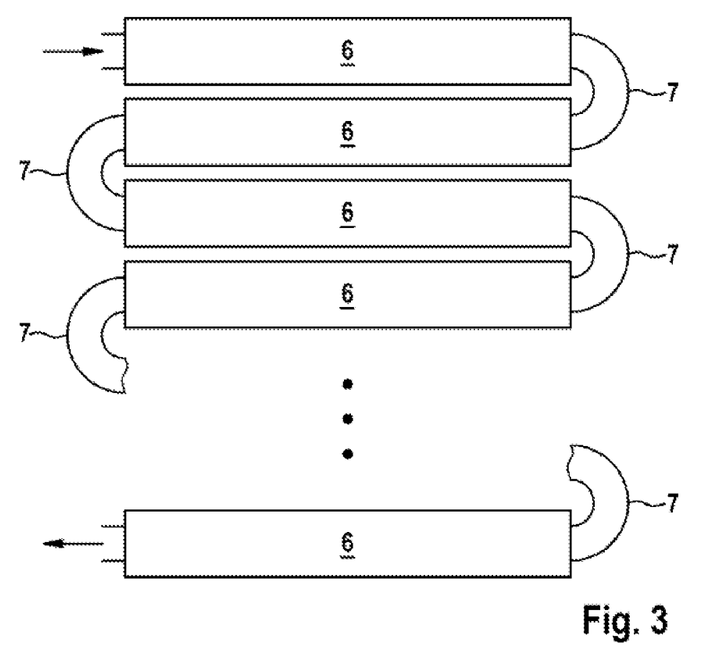
FIG. 3 shows a plan view of an illustrative embodiment of a device according to the disclosure for the temperature control of battery cells in a schematic illustration.

A device for the temperature control of battery cells in the form of the illustrative embodiment shown in FIG. 2 is shown in a plan view in FIG. 3. For reasons of greater clarity, the battery cells are not shown in FIG. 3. FIG. 3 shows a plurality of channels 6 arranged parallel to one another. These each have a lower wall, two side walls and an upper wall, wherein the outer surface of the upper wall forms the contact surface for thermal contacting of the battery cells. The individual channels 6 are connected to one another by connecting hoses 7, ensuring that a coolant flowing into the first channel 6 (indicated symbolically in FIG. 3 by the arrow pointing in the direction of the channel) flows through all the channels 6 in succession and finally emerges from the last channel 6 (indicated symbolically in FIG. 3 by the arrow pointing away from the channel 6). The connecting hoses 7 are of flexible configuration and are preferably produced from a flexible plastics material. In particular, the connecting elements 7 enable the individual channels 6 and hence the contact surface 3 for thermally contacting battery cells to be lowered independently of one another under the action of a pressure load. Preferably, provision is made for one battery cell in each case to be put in contact with the contact surface of one channel 6, one battery cell thus being arranged on each channel 6. The elements designed to have an elastic restoring action are advantageously designed in such a way that a channel 6 can be lowered by different amounts in the direction of its longitudinal extent, depending on the pressure load imposed by the battery cell arranged on the channel 6. In this way, the channels 6 can advantageously be lowered to a greater extent at one end of a channel than at the opposite end of the channel and, in particular, can also tilt sideways.

Figure 4:
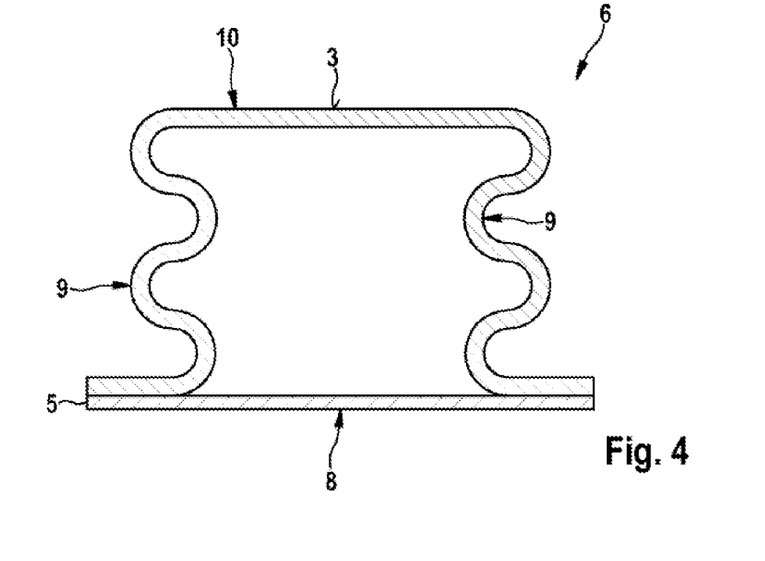
FIG. 4 shows a cross section through a channel of a device according to the disclosure for the temperature control of battery cells in a schematic illustration.

FIG. 4 shows a cross section through a channel 6 as a detail of another illustrative embodiment of a device according to the disclosure for the temperature control of battery cells. A device of this kind comprises a multiplicity of channels 6 shown in FIG. 4, which are arranged adjacent and parallel to one another. In this arrangement, each channel 6 of this kind has a lower wall 8, two mutually opposite side walls 9 and an upper wall 10. Here, the lower wall 8 is formed by a support plate 5, on which the channels 6 of the device are arranged. In this case, the outer surface of the upper wall 10 forms a contact surface 3 for thermally contacting a battery cell to be arranged on said contact surface 3. Here, the contact surfaces 3 of the channels 6 together form the contact surface of the device for the temperature control of the battery cells, in particular for the temperature control of battery cells clamped together to form a battery module. The side walls 9 of a channel 6 are each designed to have an elastic restoring action and thus form the elements designed to have an elastic restoring action below the contact surface 3 of a channel 6, which elements make it possible for the contact surface 3 of a channel 6 and hence the contact surface of the device for the temperature control of the battery cells to be lowered when a pressure load acting orthogonally to the contact surface 3 is applied. Here, a restoring force originating from the side walls 9 counteracts the pressure load. If there is a pressure load acting on the contact surface 3 of the channel 6, the side walls 9 of the channel 6 are compressed. During this process, the cross-sectional area of the channel 6 is reduced. In the illustrative embodiment, shown in FIG. 4, of a channel 6 of a device according to the disclosure, the side walls 9 have a meandering configuration to ensure the elastic restoring action. In the present case, the channel 6 is designed to allow through a flow of a coolant, e.g. the refrigerant R1234yf. Here, the coolant flows through the channel 6 perpendicularly to the plane of the drawing.

Figure 5:
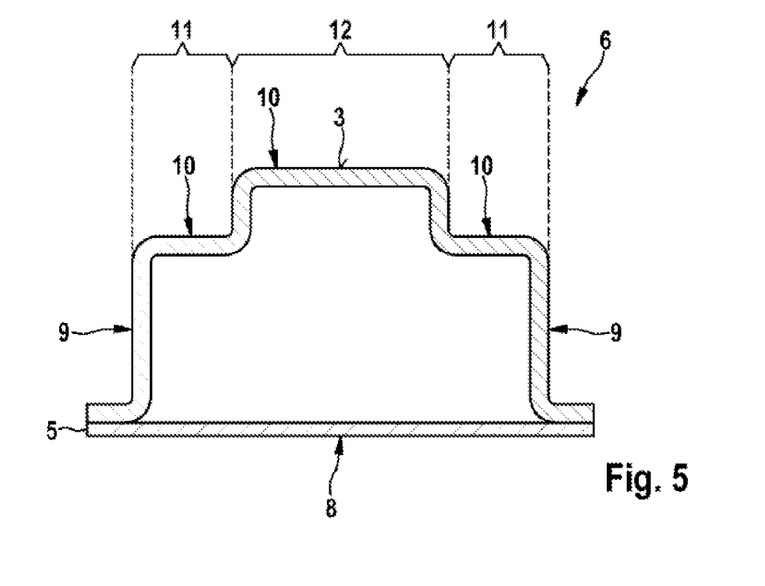
FIG. 5 shows a cross section through another channel of a device according to the disclosure for the temperature control of battery cells in a schematic illustration.

FIG. 5 shows a cross section through a channel 6 as a detail of another illustrative embodiment of a device according to the disclosure for the temperature control of battery cells of a battery. In this case, the device has a multiplicity of channels 6 arranged parallel to one another, which are each designed like the channel 6 shown in FIG. 5. The channel 6 shown in FIG. 5 has a lower wall 8, two mutually opposite side walls 9 and an upper wall 10. Here, the upper wall 10 partially forms the contact surface 3 of the device for thermally contacting the device with the battery cells to be temperature-controlled. In the illustrative embodiment, the lower wall 8 is formed by a support plate 5, on which the channels 6 are arranged. The upper wall 10 has two side regions 11 and a central region 12. Here, the central region 12 is offset outward relative to the side region 11, i.e. away from the lower wall 8. The distance between the lower wall 8 and the upper wall 10 in the central region 12 is therefore greater than the distance between the lower wall 8 and the upper wall 10 in the side regions 11. The central region 12 of the upper wall 10 is a contact surface 3 for thermally contacting a battery cell to be temperature-controlled and thus forms part of the contact surface of the device for the temperature control of the battery cells. At least in the central region 12, the upper wall 10 preferably consists of a metal with good heat conduction properties, e.g. aluminum and/or copper. The side walls 9 and the upper wall 10 in the side regions 11 are preferably produced from a flexible plastics material, wherein the side regions 11 of the upper wall 10 are designed to have an elastic restoring action and thus form the elements with an elastic restoring action arranged below the contact surface 3. Here, the transition from the side wall 9 to the upper wall 10 of the side regions 11 advantageously acts like a solid-body hinge, thereby ensuring that the contact surface 3 is lowered in accordance with the disclosure when the contact surface 3 is subject to a pressure load. The channel 6 shown in FIG. 5 is advantageously designed to allow a fluid, e.g. a water/glycol mixture, to flow through, the fluid flowing through the channel 6 orthogonally to the plane of the drawing.

Figure 6:
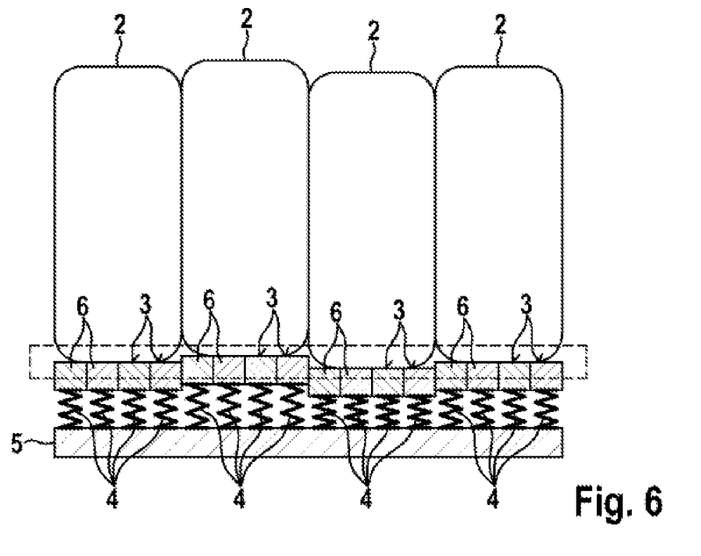
FIG. 6 shows a longitudinal section through another illustrative embodiment of a device according to the disclosure for the temperature control of battery cells in a schematic illustration.

FIG. 6 shows another illustrative embodiment of a device 1 according to the disclosure for the temperature control of battery cells 2. In contrast to the illustrative embodiment shown in FIG. 1, the width of a plurality of channels 6 arranged adjacent to one another, namely the width of 4 channels 6 arranged adjacent and parallel to one another, corresponds in the illustrative embodiment shown in FIG. 6 to the width of a battery cell 2 to be temperature-controlled. To improve heat transfer, there is a flow of fluid through the individual channels 6. The individual channels 6 are each arranged on spiral springs 4, wherein the spiral springs 4 are the elements according to the disclosure designed to have an elastic restoring action. The spiral springs 4 each have the same spring constant. The weight of the battery cells 2 themselves has the effect that the springs 4 are compressed, wherein the extent of compression depends on how the respective battery cell 2 is arranged in the cell assembly, i.e. on the vertical offset of said cell relative to the other battery cells 2. If battery cells 2 project further out of the cell assembly of battery cells 2, like the battery cell 2 arranged in the second position from the left in FIG. 6 for example, there is a lower pressure load on the contact surface 3 of the channels from said battery cells 2 than from battery cells 2 which are offset toward the contact surface 3, like the battery cell 2 arranged in the third position from the left in FIG. 6. Owing to this difference in the offset of the battery cells 2 relative to one another, the elements 4 designed to have an elastic restoring action are compressed to different extents. Owing to the restoring force of the elements 4 designed to have an elastic restoring action, the battery cells 2 are brought into optimum contact with the contact surface 3 in this arrangement. The contact surface of the device 1, which is formed by the multiplicity of individual contact surfaces 3 of the respective channels 6, is thus lowered to different extents in the regions subject to the action of different pressure loads.

The illustrative embodiments shown in the figures and explained in conjunction therewith serve to explain the disclosure and are not restrictive thereof.

The invention claimed is:
1. A device for the temperature control of battery cells of a battery, comprising:
 a contact surface configured to thermally contact the battery cells with the device, the contact surface being configured such that the battery cells to be temperature-controlled are configured to be arranged on the contact surface; and
 elements disposed below the contact surface, the elements being configured to have an elastic restoring action such that, when a pressure load acting orthogonally to the contact surface is applied, the contact surface is lowered in the region of the applied pressure load,
 wherein a restoring force acts counter to the pressure load;
 wherein the device has a channel system that is configured such that a fluid is configured to be passed through the channel system;
 wherein the channel system has a plurality of channels that are arranged parallel to one another and each have a lower wall, two mutually opposite side walls, and an upper wall;
 wherein the outer surface of the upper wall at least partially forms the contact surface of the device; and
 wherein the side walls of the channels are the elements configured to have the elastic restoring action.

2. The device as claimed in claim 1, wherein the side walls of the channels are each configured to be compressed under a pressure load.

3. The device as claimed in claim 2, wherein the side walls of the channels each have a meandering configuration.

4. The device as claimed in claim 1, wherein the width of a channel corresponds at the maximum to the width of a battery cell to be temperature-controlled.

5. The device as claimed in claim 1, wherein the width of a plurality of channels arranged adjacent to one another corresponds to the width of a battery cell to be temperature-controlled.

6. The device as claimed in claim 1, wherein the battery is configured as an energy source for driving hybrid, plug in hybrid, or electric vehicles.

7. The device of claim 1, further comprising:
a plurality of connecting hoses that connect the plurality of parallel channels such that the parallel channels are connected in series.

8. A device for the temperature control of battery cells of a battery, comprising:
a contact surface configured to thermally contact the battery cells with the device, the contact surface being configured such that the battery cells to be temperature-controlled are configured to be arranged on the contact surface; and
elements disposed below the contact surface, the elements being configured to have an elastic restoring action such that, when a pressure load acting orthogonally to the contact surface is applied, the contact surface is lowered in the region of the applied pressure load,
wherein a restoring force acts counter to the pressure load;
wherein the device has a channel system that is configured such that a fluid is configured to be passed through the channel system;
wherein the channel system has a plurality of channels that are arranged parallel to one another and each have a lower wall, two mutually opposite side walls, and an upper wall;
wherein the outer surface of the upper wall at least partially forms the contact surface of the device; and
wherein the upper wall has two side regions and a central region that is offset outward relative to the side regions, wherein the outer surface of the central region forms the contact surface of the device, and the side regions form the elements with the elastic restoring action.

9. The device as claimed in claim 8, wherein the width of a channel corresponds at the maximum to the width of a battery cell to be temperature-controlled.

10. The device as claimed in claim 8, wherein the width of a plurality of channels arranged adjacent to one another corresponds to the width of a battery cell to be temperature-controlled.

11. The device as claimed in claim 8, wherein the battery is configured as an energy source for driving hybrid, plug in hybrid, or electric vehicles.

12. A battery cell temperature control device, comprising:
a channel system including a plurality of channels arranged in a plurality of parallel channel sets such that top outer surfaces of the channels in each set form a respective contact surface region configured to support a respective battery cell, the plurality of channels configured to enable a fluid to pass therethrough; and
a respective elastic element for each set of parallel channels that supports the respective contact surface region, that is configured to actuate the respective contact surface region in response to a pressure load, and that is configured to exert a restoring force counter to the pressure load;
wherein the elastic elements and the corresponding contact surface regions are independently actuatable relative to each other.

13. The device of claim 12, wherein the respective elastic element includes at least one spring positioned below bottom outer surfaces of the channels in each set.

14. The device in claim 12, wherein the respective elastic element is formed by at least one of side-walls and the top outer surface of the channels in each set.

15. The device of claim 12, further comprising:
a respective connecting hose that, in each case, connects adjacent sets of parallel channels such that the parallel channel sets are connected in series.

16. The device of claim 12, wherein each of the plurality of channels has a width corresponding to a width of a battery cell, such that each set only includes one channel.

* * * * *